US010606726B2

(12) United States Patent
Arora et al.

(10) Patent No.: US 10,606,726 B2
(45) Date of Patent: Mar. 31, 2020

(54) METHODS, SYSTEMS AND COMPUTER READABLE MEDIA FOR PERFORMING BENCHMARK REFERENCE TESTING OF DATA CENTER AND NETWORK EQUIPMENT

(71) Applicant: Keysight Technologies Singapore (Sales) Pte. Ltd., Singapore (SG)

(72) Inventors: Deepesh Arora, Thousand Oaks, CA (US); Kirit Bhamre, Thousand Oaks, CA (US); Noah Gintis, Westlake Village, CA (US)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 1366 days.

(21) Appl. No.: 14/462,068

(22) Filed: Aug. 18, 2014

(65) Prior Publication Data
US 2015/0051872 A1 Feb. 19, 2015

Related U.S. Application Data

(60) Provisional application No. 61/866,890, filed on Aug. 16, 2013.

(51) Int. Cl.
*G06F 11/34* (2006.01)
(52) U.S. Cl.
CPC ...... *G06F 11/3428* (2013.01); *G06F 11/3419* (2013.01); *G06F 11/3414* (2013.01)
(58) Field of Classification Search
CPC ............ G06F 11/3428; G06F 11/3419; G06F 11/3414; G06F 11/22; H04L 43/08; H04L 43/50; H04L 41/14; H04L 41/147; H04L 47/10; H04L 47/12; H04L 47/11; H04L 47/127; H04W 24/06; H04W 24/08; H04Q 3/0087; H04B 17/15
See application file for complete search history.

(56) References Cited

U.S. PATENT DOCUMENTS 8,689,224 B2      4/2014  Hotra
2005/0128943 A1*  6/2005  Gibbs ................. H04L 43/00
                                              370/229
(Continued)

OTHER PUBLICATIONS

Technology Innovation Management Review, Performance Testing From the Cloud, Apr. 2010, pp. 1-6.*
Stopp et al., "Methodology for IP Multicast Benchmarking," RFC 3918, pp. 1-31 (Oct. 2004).
Mandeville et al., "Benchmarking Methodology for LAN Switching Devices," RFC 2889, pp. 1-35 (Aug. 2000).
(Continued)

*Primary Examiner* — Sujoy K Kundu
*Assistant Examiner* — L. Anderson

(57) ABSTRACT

Methods, systems, and computer readable media for benchmark reference testing of data center or network equipment are disclosed. One method includes, using a network or data center test device, executing a plurality of performance tests to test a plurality of different performance parameters of a network or data center device under test. The method further includes obtaining individual test results for each of the different performance parameters. The method further includes generating a multi-dimensional score that combines the individual test results from the different performance parameters to indicate a composite performance of the data center or network device. The method further includes outputting the multi-dimensional score to a user.

13 Claims, 8 Drawing Sheets

(56) References Cited

U.S. PATENT DOCUMENTS

| | | | |
|---|---|---|---|
| 2005/0265321 A1* | 12/2005 | Rappaport | H04L 41/145 370/352 |
| 2006/0233111 A1* | 10/2006 | Wright | H04B 17/0087 370/241 |
| 2007/0198881 A1* | 8/2007 | Volkerink | G01R 31/31903 714/724 |
| 2012/0029898 A1 | 2/2012 | Carroll et al. | |
| 2012/0072968 A1 | 3/2012 | Wysopal et al. | |
| 2013/0085769 A1* | 4/2013 | Jost | G06Q 50/22 705/2 |
| 2014/0215487 A1 | 7/2014 | Cherkasova et al. | |
| 2014/0351412 A1 | 11/2014 | Elisha | |
| 2015/0006966 A1 | 1/2015 | Dimitrovich et al. | |
| 2017/0060720 A1 | 3/2017 | Ramanath | |
| 2017/0322827 A1 | 11/2017 | Little et al. | |

OTHER PUBLICATIONS

Bradner et al., "Benchmarking Methodology for Network Interconnect Devices," RFC 2544, pp. 1-31 (Mar. 1999).
"VMware VMmark® Benchmarking Guide," VMmark http://www.vmware.com/products/vmmark/, pp. 1-188 (Feb. 5, 2014).
Henning, "SPEC CPU2006 Benchmark Descriptions," pp. 1-17 (2006).
Non-Final Office Action for U.S. Appl. No. 14/838,335 dated (Jun. 14, 2019).
Non-Final Office Action for U.S. Appl. No. 14/838,335 dated (Sep. 12, 2018).
Final Office Actions for U.S. Appl. No. 14/838,335 (dated Jan. 3, 2020).

\* cited by examiner

METHODS, SYSTEMS AND COMPUTER READABLE MEDIA FOR PERFORMING BENCHMARK REFERENCE TESTING OF DATA CENTER AND NETWORK EQUIPMENT

PRIORITY CLAIM

This application claims the benefit of U.S. Provisional Patent Application Ser. No. 61/866,890, filed Aug. 16, 2013; the disclosure of which is incorporated herein by reference in its entirety.

TECHNICAL FIELD

The subject matter described herein relates to testing data center and network equipment. More particularly, the subject matter described herein related to methods, systems, and computer readable media for performing benchmark reference testing of data center and network equipment.

BACKGROUND

The information technology (IT) industry is in the midst of a fundamental change toward centralization of application delivery via concentrated and dense private and public data center cloud computing sites.

A data center is a facility used to house computer systems and associated components (i.e., storage systems). Data centers typically provide high reliability and security. Data centers are often shared resources used by multiple clients of the data center operator. Large data centers are industrial scale operations using as much electricity as a small town.

Data centers are experiencing a new type of traffic pattern that is fundamentally changing design plus latency and performance attributes. Not only are traditional north-south or client-server flows growing but east-west or server-server flows now dominate most private and public datacenter cloud facilities.

Equipment manufacturers are now designing equipment that is specially designed to be used in data centers. This equipment is capable of forwarding data traffic with ultra-low latency and maximum throughput. 10 gigabit Ethernet switches produce 400 to 700 nanoseconds of latency. It is anticipated that 100 gigabit Ethernet switching will reduce latency to as low as 100 nanoseconds. In special applications, such as high frequency trading and other financial applications, differences in latency can result in millions of dollars in revenue lost or gained, placing enormous pressure on networking devices to be as fast as engineers can design.

Therefore, data center managers are facing many critical challenges in designing a data center solution that meets their business needs. Their dilemmas include determining how to test/validate the performance and resiliency of their network and evaluating the performance of devices from different vendors. Data center managers often lack sufficient knowledge and expertise to run various test methodologies which can validate the performance of a device under test (DUT). Ultimately, data center managers want to build a data center network using devices that excel in performance and maximize return on their investment.

Tests available from test system manufacturers can individually test performance metrics, such as jitter, throughput, and latency and provide separate results from each test. However, individually, these performance metrics do not characterize the overall performance of a device under test, and test results may vary greatly depending on test setup conditions. Even assuming that test conditions used to evaluate devices from different vendors are the same, if a device from vendor A has a higher throughput test result (high throughput is desirable) than a device from vendor B but also has a higher jitter or latency test result (high jitter and high latency are undesirable), the data center manager will still not know which device has the better performance because the data center manager may not know how to characterize the relative importance of the latency, jitter, and throughput test results.

In addition, even for a single parameter, such as latency, there are multiple different standardized latency tests. If vendor A's device performs better than vendor B's device in one standardized latency test but poorer in another standardized latency test, the data center manager is again faced with the problem with how to characterize the relative importance of the two different standardized tests.

Accordingly, in light of these difficulties, there exists a long felt need for methods, systems, and computer readable media for performing benchmark reference testing of data center and network equipment.

SUMMARY

Methods, systems, and computer readable media for benchmark reference testing of data center or network equipment are disclosed. One method includes, using a network or data center test device, executing a plurality of performance tests to test a plurality of different performance parameters of a network or data center device under test. The method further includes obtaining individual test results for each of the different performance parameters. The method further includes generating a multi-dimensional score that combines the individual test results from the different performance parameters to indicate a composite performance of the data center or network device. The method further includes outputting the multi-dimensional score to a user.

The subject matter described herein for benchmark reference testing of network and data center equipment may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
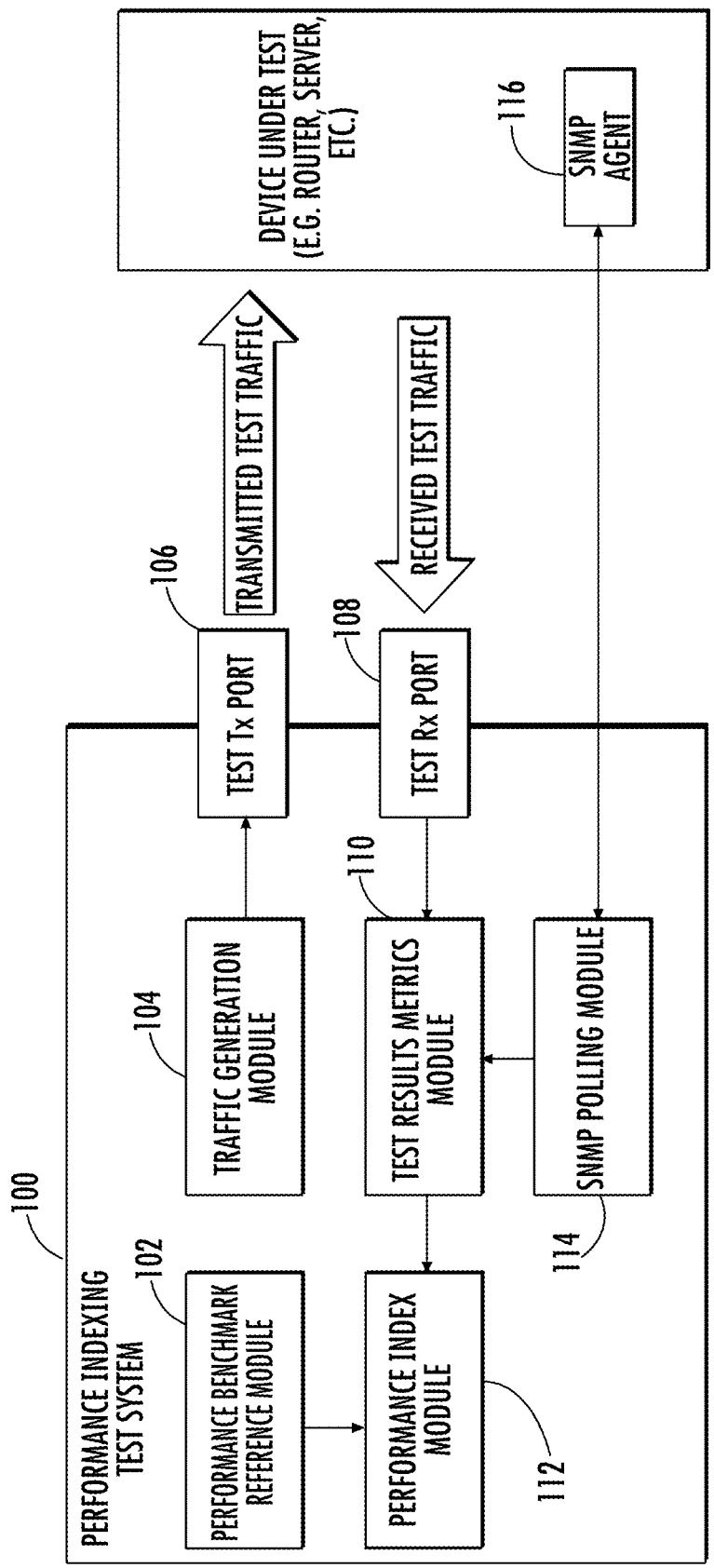
FIG. 1 is a block diagram of a performance index testing system according to an embodiment of the subject matter described herein.

The subject matter described herein relates to performance index testing of data network and storage network equipment. FIG. 1 is a block diagram illustrating an exemplary performance index testing system according to an embodiment of the subject matter described herein. In FIG. 1, the performance index testing system 100, also referred to herein as a network or data center test device, comprises a special purpose computing platform that is used to generate test traffic, send test traffic to a device under test, and generate a performance index score based on the received test traffic. As such, performance index testing system 100 may include at least one processor and associated memory for implementing the testing and performance metric calculations.

Moreover, rather than computing and outputting only individual results for each performance metric and standardized test, the subject matter described herein includes a method and a system for generating a multidimensional score that is based on results from at least two different individual performance parameter test results. The multidimensional score may combine results from tests that different parameters (such as jitter, latency, and throughput) and from tests that are based on different industry standards. Because the multidimensional score combines the results from multiple different performance parameter tests, a test engineer or even a data center manager can execute battery of tests, generate a single score for all of the tests, and use the score to evaluate the relative performance of network or data center equipment across a range of performance parameters.

According to another aspect of the subject matter described herein, rather than computing raw numbers of latency, throughput, jitter, and other metrics, which may vary greatly depending on how a test is run, performance index testing system 100 assigns performance metrics to bins or ranges and outputs a score for each bin or range. As a result, variations in results based on differences in test set-up have a reduced effect on the score. Such a system is useful for testing equipment of different manufacturers and allowing apples to apples comparison of the performance of the equipment from different manufacturers.

In FIG. 1, performance index testing system 100 includes a performance benchmark reference module 102 for maintaining reference operational and performance characteristics. The reference operational attributes are those that are of interest to a particular test, such as thresholds for latency, jitter, and throughput. These thresholds may be input by the user or may be stored by the test system. The thresholds may be used to assign scores to equipment based on results in each tests, and the scores from the individual tests may eventually be combined into the multidimensional composite score.

A traffic generation module 104 generates test traffic and sends test traffic to the device under test. Traffic generation module 104 may generate traffic according to the protocol required for a particular test. Exemplary tests will be described in detail below.

Performance index testing system 100 further includes a test transmit port 106 and a test receive port 108. Test transmit port 106 and test receive port 108 are the network interfaces where performance index testing system 100 sends and receives traffic. It should also be noted that although separate transmit and receive ports are shown, that transmit port 106 and receive port 108 may be a single physical network interface.

The system illustrated in FIG. 1 further includes a test results metrics module 110 for generating test result metrics based on transmitted and received test traffic. The test results generated by test results metrics module 110 may be measurements of latency, throughput, or jitter based on time stamps in transmitted and received traffic.

The system illustrated in FIG. 1 further includes a performance index module 112 for generating the performance index score based on the test result metrics measured by test results metrics module 110 and target performance attributes and characteristics either input by the user or hard coded by the test system designer. Examples of various types of tests will be described in detail below.

The system illustrated in FIG. 1 further includes an SNMP polling module 114 for communicating with an SNMP agent 116 on device under test 101. SNMP polling module 114 may query SNMP agent 116 before, during, and/or after a performance index test to obtain DUT state information. For example, SNMP polling module 114 may use SNMP to obtain a snapshot of internal resource states at various times during the performance indexing test. In one example, SNMP could be used to poll a server to obtain link status information, available memory information, temperature information, etc.

According to another aspect of the subject matter described herein, testing may be tailored to a particular device type. For example, the user may input the device type of the device under test, such as server, router, etc. Performance benchmark reference module 102 may store test configuration information that tailors a test and the results to a particular device type. The traffic generated and sent to the device under test may be stateful or stateless communications traffic and may include packets associated with simulated control plane and/or user plane communications, where the particular type of traffic or traffic profile selected for performing index testing is based at least in part on the specified device type information.

Test traffic may be received on the receive port and statistics and metrics may be computed based on the test traffic. The metric statistics are used to compute a performance index score.

In an alternate implementation, rather than having the user input the device type, the test system may query the device under test prior to the testing to obtain device type information. This obtained device type information may be used to select the appropriate test traffic and performance metrics used to generate the performance index score.

According to yet another aspect of the subject matter described herein, emulation environment information may be used to automatically configure the test for testing the device under test. In one example, prior to execution of a performance indexing test for a device under test, the test system may be configured or provisioned by a test system operator with information that identifies the type of network environment in which the device under test is to be tested. For example, the test system operator may configure or provision the test system to simultaneously emulate one or more end user devices, such as UEs or network elements, servers, routers, access points, etc.

Based at least in part on the provisioned emulation environment information, the test system may configure the performance indexing test appropriately, which generates test packets and communicates the test packets to the device under test via the test port. The test traffic may be stateful or stateless traffic, may include packets associated with simulated control plane and/or user plane communications, where the particular type of traffic or traffic profile for the test is based at least in part on the emulation environment information.

The test traffic may be received at the receive port and various metrics or statistics may be computed based on the test traffic. These metrics or statistics are then used to compute a contextual performance index score for the device under test, where the performance index score is relevant in the context of the emulation environment. As with the previous embodiments, the test system may be polled before, during, and after the test to obtain state information and/or device type information.

Figure 2:
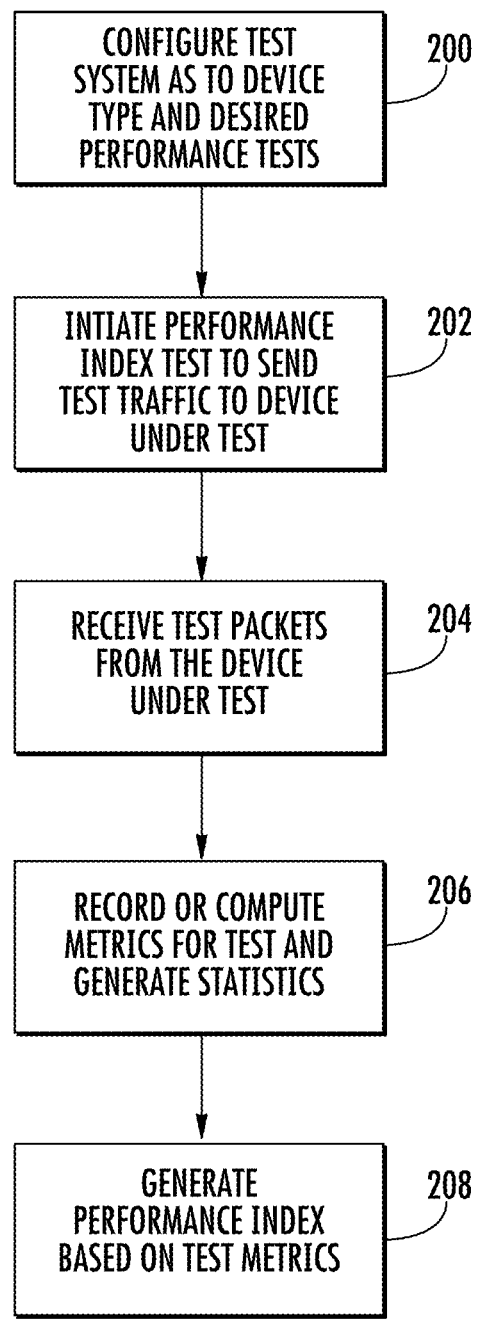
FIG. 2 is a flow chart illustrating an exemplary process for performance index testing according to an embodiment of the subject matter described herein.

FIG. 2 is a flow chart illustrating an exemplary process for performing performance index testing according to an embodiment of the subject matter described herein. Referring to FIG. 2, in step 200, the test system is configured according to the device type and the desired performance tests. For example, details of the device under test, the specific performance tests to be performed, and the emulation environment may be input by the user or pre-programmed. In step 202, the performance index test is initiated to send test traffic to the device under test. For example, based on the device type, the specific test being performed, and the emulation environment, test packets may be generated and sent to the device under test. Test packets may be time stamped so that metrics, such as latency, throughput, and jitter, can be measured. In step 204, test packets are received from the device under test. The test packets may be received at the receive port illustrated in FIG. 1.

In step 206, metrics associated with the test may be computed or recorded and statistics may be generated. For example, actual or average measures of latency, throughput, and jitter may be determined for different frame sizes based on the difference in time stamps between transmission and reception of corresponding test packets. In step 208, a performance index is generated based on the test metrics. The performance index may be a multidimensional score that combines test results for different parameters and/or different testing standards.

One testing standard that describes tests that may be used to test the performance of a device under test is IETF RFC 2544. According to the tests, layer 2 and layer 3 unicast traffic may be sent to a device under test. The frame size of the test packets may be varied using different frame sizes, such as 64, 128, 512, 1024, 1280, 1518, 2176, and 9216 bytes. In addition, a mix of north-south (client-server) and east-west (server-server) traffic may be generated.

RFC 2544 includes tests that measure throughput, latency, and jitter. Scores may be generated for each test, and the scores for the different RFC 2544 tests and scores from other tests may be combined to generate a multidimensional score. For example, Table 1 shown below illustrates an exemplary algorithm that may be used to generate a multidimensional performance index score according to an embodiment of the subject matter described herein.

TABLE 1

Multidimensional Performance Index Score Calculation

| TEST | MAX POSSIBLE POINTS |
| --- | --- |
| RFC 2544 Throughput | 25 |
| RFC 2544 Latency | 25 |
| RFC 2544 Jitter | 10 |
| RCF 2889 | 10 |
| RFC 3918 | 20 |
| Cloud Performance | 10 |
| Total | 100 |

In Table 1, the RFC 2544 throughput and latency metrics can each achieve a maximum of 25 points, where higher numbers indicate greater throughput or reduced latency. Similarly, RFC 2544 jitter is assigned a maximum value of 10 points, where lower jitter is a higher score. Tests results for RFC 2889 and 3918 tests and cloud performance tests are respectively assigned a maximum possible score of 10, 20, and 10 points. The maximum score is 100 points, where a higher number indicates better performance. Each of the tests and score assignment for each test will now be described in more detail.

Figure 3:
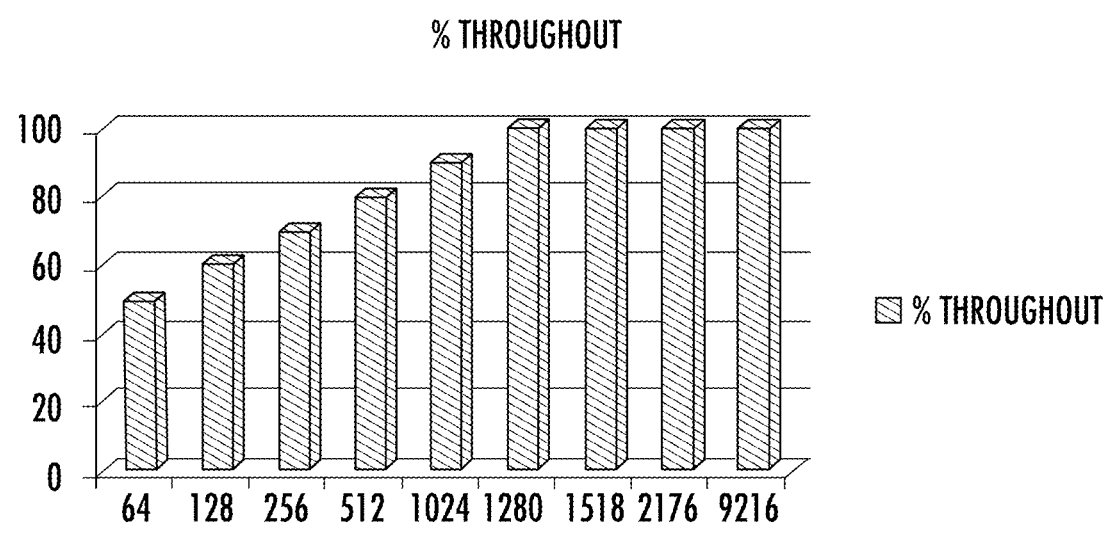
FIG. 3 is a graph illustrating exemplary results of an Internet Engineering Task Force (IETF) request for comments (RFC) 2544 throughput test generated by a test system according to an embodiment of the subject matter described herein.

As described above, for the RFC 2544 test, frames of different sizes are sent to the device under test, and latency, throughput, and jitter are determined for each frame size. FIG. 3 illustrates a result of throughput scores that may be generated by the test system illustrated in FIG. 1 for the RFC throughput 2544 test. The throughput test determines the device under test's capability for traffic at the maximum rate at which data can be transported from source to destination with zero error or lost frames. As illustrated by FIG. 3, the larger the frame sizes, the higher the percentage of throughput or the lower the percentage of lost frames, as would be expected as smaller frames take more processing power. The test uses a binary search algorithm to determine the maximum throughput value for each frame size. A test runs layer 2 and layer 3 unicast traffic for the common frame sizes listed in the graph. In addition, a cloud computing simulation throughput test may be performed to have a mix of north-south plus east-west traffic. The following algorithm may be used to compute the score for each individual parameter:

$$\text{parameter score} = \text{aggregate parameter score} \times \text{total points}/(\text{number of frame sizes} \times 100) \tag{1}$$

Table 2 shown below illustrates throughput data corresponding to the graph in FIG. 3 and the corresponding throughput scores.

TABLE 2

Scores for RFC 2544 Throughput Test

| Frame Size | % Throughput |
|---|---|
| 64 | 50 |
| 128 | 60 |
| 256 | 70 |
| 512 | 80 |
| 1024 | 90 |
| 1280 | 100 |
| 1518 | 100 |
| 2176 | 100 |
| 9216 | 100 |
| Aggregate Throughput Score | 750 |

In Table 2, the left hand column corresponds to frame sizes transmitted to the device under test in the RFC 2544 throughput test, and the right hand column gives the throughput score for each frame size. The aggregate throughput score is the sum of the scores in the right hand column. From the data in Table 2, the total score for throughput can be calculated using Equation 1 as follows:

Throughput score=aggregate throughput score×total points/(number of frame sizes×100)

$$\frac{750 \times 25}{9 \times 100} = 20.833$$

Figure 4:
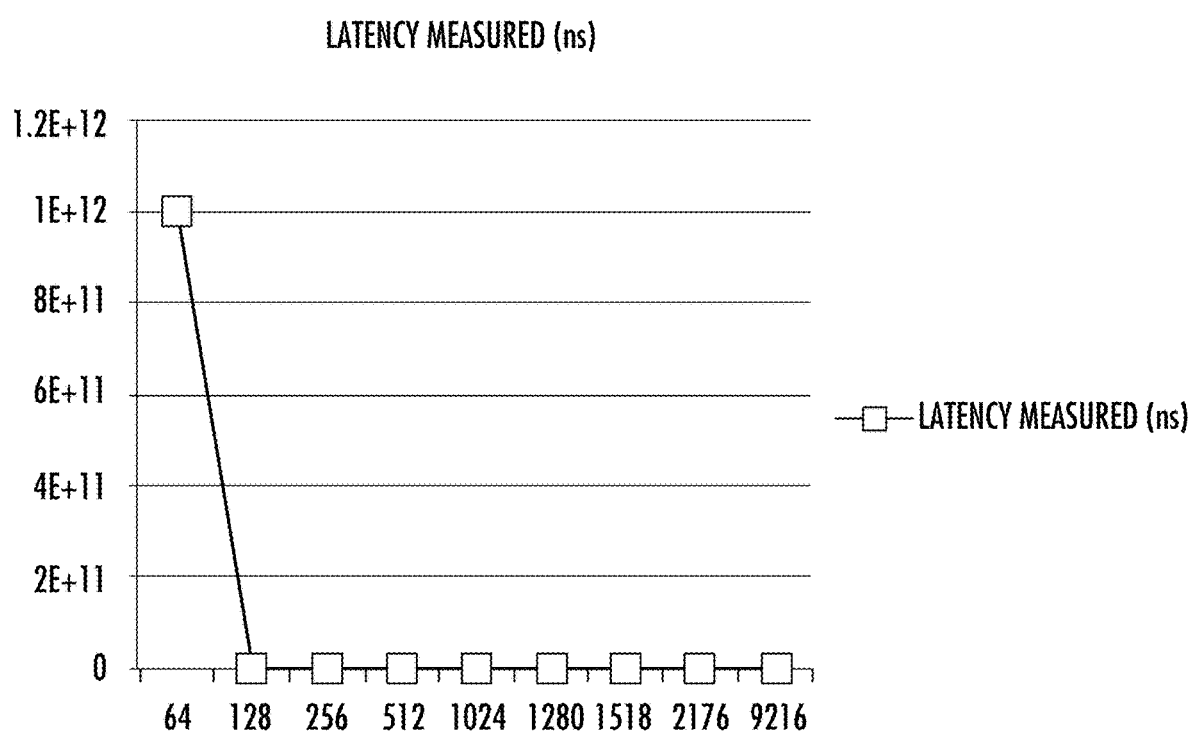
FIG. 4 is a graph illustrating exemplary results of an IETF RFC 2544 latency test generated by a test system according to an embodiment of the subject matter described herein.

FIG. 4 illustrates an example of results from the RFC 2544 latency test. Latency is the total time taken for a frame to travel from the source to a destination. The total time is the sum of both the processing delays and the network elements and the propagation delay along the transmission medium. In order to measure the latency, a test frame containing a time stamp is transmitted through the network. The time stamp is checked when the frame is received. The latency value will be the difference between the transmit and receive time stamps.

The latency will be measured using the same frame sizes used for the RFC 2544 throughput test, which means the tests will be run through various frame sizes such as 64, 128, 256, 512, 1024, 1280, 1518, 2176, and 9216 bytes. Two types of latency tests will be conducted:

1. latency measurement between two ports on different modules (for modular switches); and
2. between multiple switches.

The maximum score for the RFC 2554 latency test will be 25 points. The scoring will be performed based on percentile. Tables 3 and 4 illustrate exemplary latency data and scoring corresponding to the graph illustrated in FIG. 4.

TABLE 3

Score Assignment for RFC 2544 Latency Test

| level | Score Increments per Latency Increments | score stops | level stops | Score % | score | level |
|---|---|---|---|---|---|---|
| 0 | | −5 | 251 | 100 | 0 | 0 |
| 251 | (0.019920318725) | −25 | 750 | 95 | −5 | 251 |
| 1001 | (0.033333333333) | −30 | 99,000 | 70 | −30 | 1001 |
| 100001 | (0.000303030303) | −35 | 999,900,000 | 40 | −60 | 100001 |
| 1000000001 | (0.000000035004) | −5 | 998,999,999,999 | 5 | −95 | 1E+09 |
| 1E+12 | (0.000000000005) | | | 0 | −100 | 1E+12 |

In Table 3, the first column includes latency levels used to assign scores to measured latency values. One part of the calculation is determining a latency level for a measured latency score. The latency level is determined by the value in column 1 that is closest to but greater than the measured latency value. For example, a measured latency value of 300 ns would be assigned to level 1001. The second column represents a number of latency score increments per latency increment over a given latency level. Thus, for the 1001 level, the assigned score is −30, which would be the exact score if the latency measured exactly 1001 ns. The score for the previous level of 251 is −5. There are 25 score stops between −30 and −5. There are 750 latency level stops between 1001 and 251. Accordingly, the number of score increments per latency level increments for the 1001 level is 25/750=0.033333333333. As will be described with respect to Table 4, the increment values in column 2 of Table 3 are used to compute latency scores for measured latency values that fall between the boundary levels.

The third column in Table 3 includes latency levels or boundaries used in calculating latency values. The fourth column in Table 3 is the number of latency level stops between latency level boundaries. The fifth column in Table 3 is the latency score on a for each boundary latency level, where the scores range from 0 to 100, where 100 corresponds to the lowest latency level. The sixth column is the latency score on a scale from 0 to −100, where 0 corresponds to the highest latency level. The seventh column in Table 3 is the same as the first column.

TABLE 4

Measured Latency Values for RFC 2544 Latency Test and Corresponding Scores

| Frame Size | Latency measured (ns) | picked value | marker | −1*diff*factor | score |
|---|---|---|---|---|---|
| 64 | 250 | −5 | 251 | 0.019920319 | 95.01992032 |
| 128 | 251 | −30 | 1001 | 25 | 95 |
| 256 | 300 | −30 | 1001 | 23.36666667 | 93.36666667 |
| 512 | 1000 | −30 | 1001 | 0.033333333 | 70.03333333 |
| 1024 | 1001 | −60 | 100001 | 30 | 70 |
| 1280 | 200 | −5 | 251 | 1.015936255 | 96.01593625 |
| 1518 | 200 | −5 | 251 | 1.015936255 | 96.01593625 |
| 2176 | 200 | −5 | 251 | 1.015936255 | 96.01593625 |
| 9216 | 200 | −5 | 251 | 1.015936255 | 96.01593625 |

Table 4 illustrates measured latency values for different frame sizes and the corresponding scores calculated using the data in Table 3. For example, for frame size 256, the measured latency value is 300 ns. From Table 3, the latency level is 1001 and the "picked value" used to calculate the actual score is −30. The picked value is the value from column 3 of Table 3 corresponding the lowest latency level in column 1 that is greater than the measured value. In this example, the lowest latency level in column 1 of Table 3 that is greater than 300 is 1001 and −30 is the picked value that corresponds to latency level 1001. The latency score for the measured latency of 300 ns is calculated as follows 100−(picked value−diff. factor*(latency level−measured value))

$$100-(30-0.0333333*(1001-300))=93.367. \quad (2)$$

In Equation 2, "diff factor_" is the value from column 5 of Table 4, which corresponds to the value from the second column of Table 3 for the lowest latency level that is greater than the measured latency value. In this example, the lowest latency level that is greater than 300 is 1001, and the corresponding diff factor value from column 2 of Table 3 is 0.033333.

The calculated latency scores for each frame size appear in the last column of Table 4. The latency scores for the remaining frame sizes may be calculated similarly to the score for frame size 256 in the preceding example.

Once the latency scores for each frame size are calculated, a composite latency score that represents an average across all of the measure frame sizes is calculated. Table 5 shown below illustrates the composite latency score computed for the data in Table 4 using Equation 1 above.

TABLE 5

Composite Latency Score for RFC 2544 Latency Test

| Score Scale | 25 |
|---|---|
| Avg. Latency Score | 8.459983769 |

The measured latency score can be calculated using Equation 1 above as follows:

Composite Latency score=aggregate latency score× total points/(number of frame sizes×100)

$$\frac{807.48 \times 25}{9 \times 100} = 22.43$$

The aggregate latency score used in Equation 1 is the sum of the latency scores from column 6 of Table 4. The number of possible points is 25 based on the score assignment in Table 1. The number of frame sizes is 9, because there 9 different frame sizes used in the test. The composite latency score is 22.43.

Figure 5:
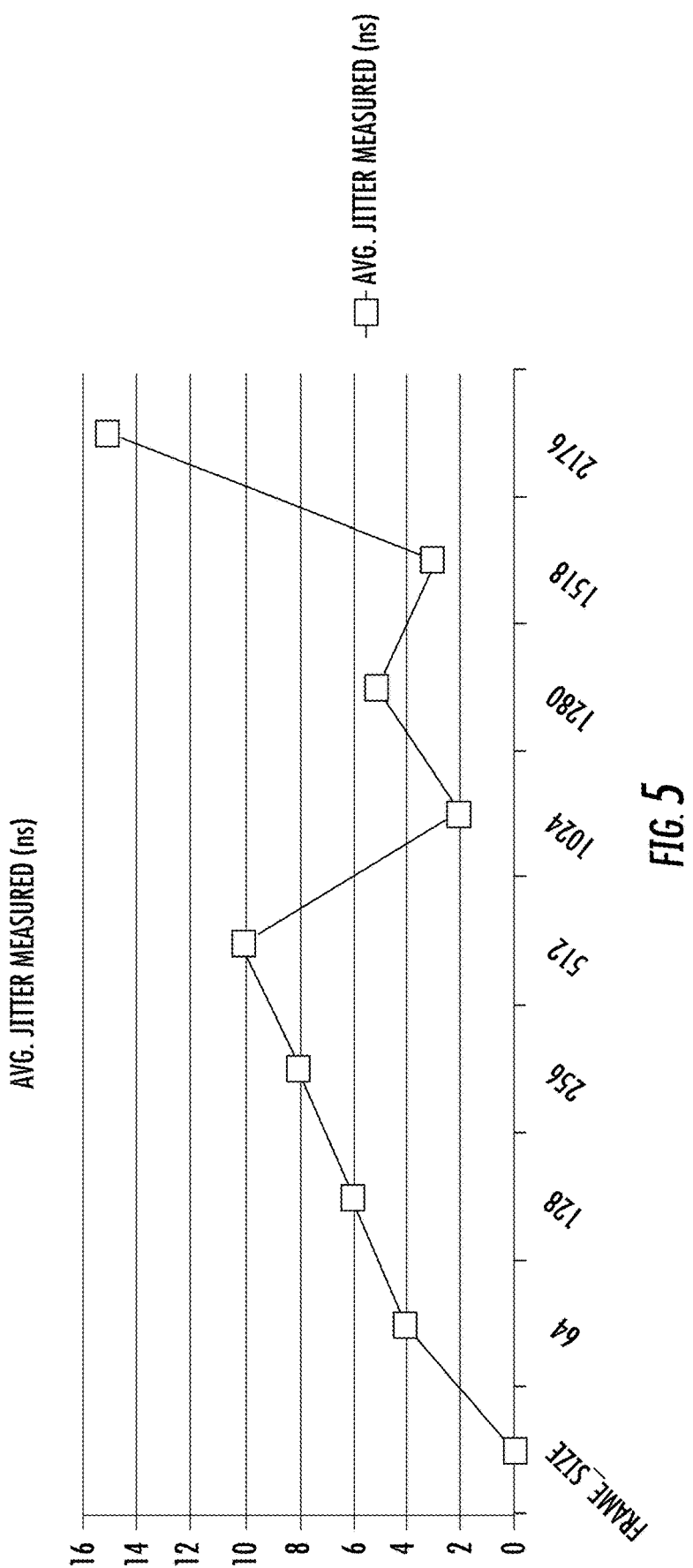
FIG. 5 is a graph illustrating results of an IETF RFC 2544 jitter test according to an embodiment of the subject matter described herein.

Another component of the composite score is jitter. Jitter is a metric of the difference in arrival times of packets. Jitter may be determined based on the differences in arrival times for packets of various frame sizes according to RFC 2544. FIG. 5 is a graph illustrating exemplary measured jitter for the different frame sizes listed. Tables 6 and 7 shown below illustrate exemplary data used to assign a jitter score for the RFC 2544 jitter test.

TABLE 6

Score Assignments for RFC 2544 Jitter Test

| Score | Level |
|---|---|
| 0 | — |
| −5 | 4 |
| −30 | 6 |
| −60 | 9 |
| −95 | 15 |
| −100 | |

In Table 6, the right hand column includes jitter values in nanoseconds, and the left hand column includes corresponding jitter score levels to be used in calculating a jitter score. For example, if a measured jitter value is 9, the corresponding "picked value" is −60.

TABLE 7

Measured Jitter Values and Corresponding Jitter Scores for RFC 2544 Jitter Test

| Frame Size | Avg. Jitter measured (ns) | picked value | marker | −1*diff*factor | Score |
|---|---|---|---|---|---|
| 64 | 0 | −5 | 4 | 5 | 100 |
| 128 | 4 | −30 | 6 | 10 | 80 |
| 256 | 6 | −60 | 8 | 15 | 55 |
| 512 | 8 | −95 | 10 | 19 | 24 |
| 1024 | 10 | −100 | 15 | 33.33333333 | 33.33333333 |
| 1280 | 2 | −5 | 4 | 2.5 | 97.5 |
| 1518 | 5 | −30 | 6 | 5 | 75 |
| 2176 | 3 | −5 | 4 | 1.25 | 96.25 |
| 9216 | 15 | −100 | 15 | 0 | 0 |
| Score scale | 10 | | | | |
| Jitter score | 6.234259259 | | | | |

Table 7 illustrates measured jitter values for different frame sizes and the corresponding scores calculated using the data in Table 6. For example, for frame size 512 bytes, the measured (average) jitter value is 8 ns. From Table 6, the "picked value" used to calculate the actual score is −95. The "diff factor" in column 5 for the measured jitter of 8 ns is calculated as follows:

Diff factor = (marker value − measured value)* \quad (3)

(picked value/marker value)*(−1)

(10 − 8)*(−95/10)*(−1)

19

The jitter score for frame size 512 bytes is calculated as follows:

$$\text{Jitter Score} = 100 + \text{diff factor} + \text{picked value} \quad (4)$$
$$= 100 + (-95) + 19$$
$$= 24$$

The jitter scores for the remaining frame sizes in Table 7 may be calculated using the same equations shown in the preceding example for frame size 9216. The composite score for jitter may be calculated using Equation 1 as follows:

Composite jitter score=aggregate jitter score×total points/(number of frame sizes×100)

$$\frac{561.083 \times 10}{9 \times 100} = 6.234$$

The aggregate jitter score is the sum of the jitter scores for the different frame sizes and is calculated by summing the values in the last column of Table 7.

Figure 6:
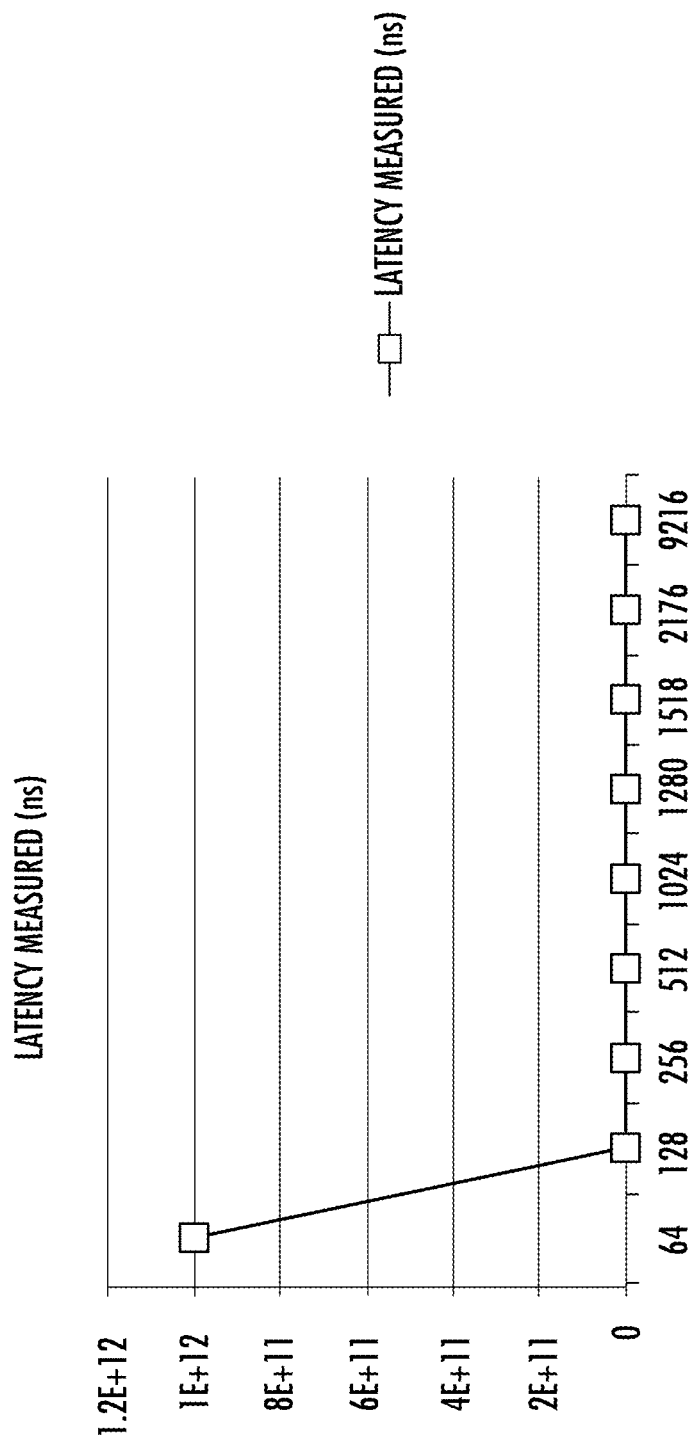
FIG. 6 is a graph illustrating results of an IETF RFC 3918 latency test performed by a test system according to an embodiment of the subject matter described herein.
Figure 7:
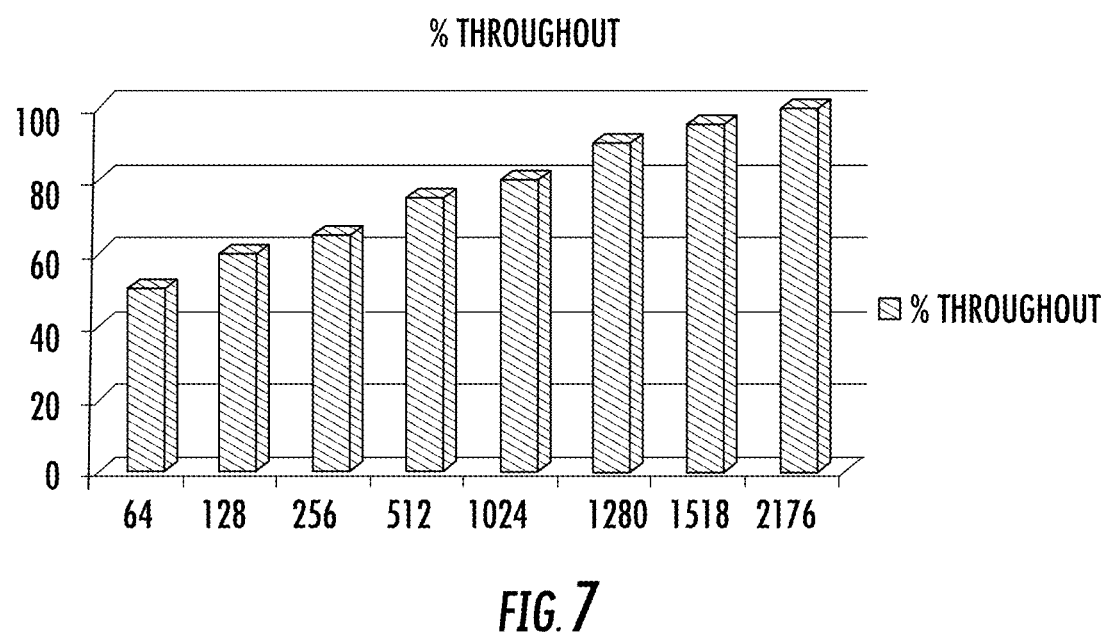
FIG. 7 is a graph illustrating results of an IETF RFC 3918 throughput test performed by a test system according to an embodiment of the subject matter described herein.

Latency and throughput may also be measured using the RFC 3918 metric and assigned a total of 20 points. FIGS. 6 and 7 respectively illustrate measured latency and measured throughput using the RFC 3918 method. The RFC 3918 method includes sending multicast only traffic to a single multicast group and measuring the corresponding throughput and latency. The number of groups can be increased and the test may be re-run. Test traffic may be a mixture of unicast and multicast. Average latency and throughput are measured for various frame sizes, and the results are illustrated in FIGS. 6 and 7. Tables 8-10 illustrate the assignment of a score out of 10 possible points for the RFC 3918 latency test, and Table 11 illustrates score assignment out of 10 possible points for the RFC 3918 throughput test.

TABLE 8

Score Assignment for RFC 3918 Latency Test

| Level | Increments | score stops | level stops | score % | score | level |
|---|---|---|---|---|---|---|
| 0 |  | −5 | 251 | 100 | 0 | 0 |
| 251 | (0.019920318725) | −25 | 750 | 95 | −5 | 251 |
| 1001 | (0.033333333333) | −30 | 99,000 | 70 | −30 | 1001 |
| 100001 | (0.000303030303) | −35 | 999,900,000 | 40 | −60 | 100001 |
| 1000000001 | (0.000000035004) | −5 | 998,999,999,999 | 5 | −95 | 1E+09 |
| 1E+12 | (0.000000000005) |  |  | 0 | −100 | 1E+12 |

The values in Table 8 may be used to generate latency scores for the RFC 3918 latency test in the same manner described above for the RFC 2544 latency test.

TABLE 9

Latency Scores Different Frame Sizes for RFC 3918 Latency Test

| Frame Size | Latency measured (ns) | picked value | marker | −1*diff*factor | score |
|---|---|---|---|---|---|
| 64 | 1000 | −30 | 1001 | 0.033333333 | 70.03333333 |
| 128 | 950 | −30 | 1001 | 1.7 | 71.7 |
| 256 | 800 | −30 | 1001 | 6.7 | 76.7 |
| 512 | 700 | −30 | 1001 | 10.03333333 | 80.03333333 |
| 1024 | 625 | −30 | 1001 | 12.53333333 | 82.53333333 |
| 1280 | 450 | −30 | 1001 | 18.36666667 | 88.36666667 |
| 1518 | 200 | −5 | 251 | 1.015936255 | 96.01593625 |
| 2176 | 150 | −5 | 251 | 2.011952191 | 97.01195219 |
| 9216 | 50 | −5 | 251 | 4.003984064 | 99.00398406 |

TABLE 10

Composite Latency Score for RFC 3918 Latency Test

| Score Scale | 10 |
|---|---|
| Avg. Latency Score | 8.46 |

The composite latency score in Table 10 can be computed using the individual scores in Table 9 and Equation 1:

RFC 3918 Composite Latency score=aggregate latency score×total points/(number of frame sizes×100)

$$\frac{761 \times 10}{9 \times 100} = 8.459$$

The aggregate latency score is the sum of the latency scores for the different frame sizes and is calculated by summing the values in the last column of Table 9.

Table 11 shown below illustrates results for the RFC 3918 throughput test.

TABLE 11

Throughput Scores for RFC 3918 Throughput Test

| Scale size | 10 |
|---|---|
| Number of FS | 9 |
| % Throughput | 100 |

| Frame Size | % Throughput |
|---|---|
| 64 | 50 |
| 128 | 60 |
| 256 | 65 |
| 512 | 75 |
| 1024 | 80 |
| 1280 | 90 |

TABLE 11-continued

Throughput Scores for RFC 3918 Throughput Test

| | |
|---|---|
| 1518 | 95 |
| 2176 | 100 |
| 9216 | 100 |
| Total Performance | 715 |
| Throughput Score | 7.944444444 |

In the illustrated example, it can be seen that the average latency score is 8.459 and the average throughput score is 7.94. The total composite score for the RFC 3918 test is the sum of the latency and throughput scores, which in this case is 8.459+7.94=16.399.

Yet another test that may be performed and included in the composite score is the RFC 2889 congestion control test. The objective of the congestion control test is to determine how a DUT handles congestion. Specifically, the congestion control test is designed to determine whether the device implements congestion control and does congestion on one port affect an uncongested port. This procedure determines if head of line blocking and/or backpressure is present. If there is frame loss at the uncongested port, head of line blocking is present. The DUT cannot forward the amount of traffic to the congested port and as a result it is also losing frames destined to the uncongested port. If there is no frame loss on the congested port, then backpressure is present.

Figure 8:
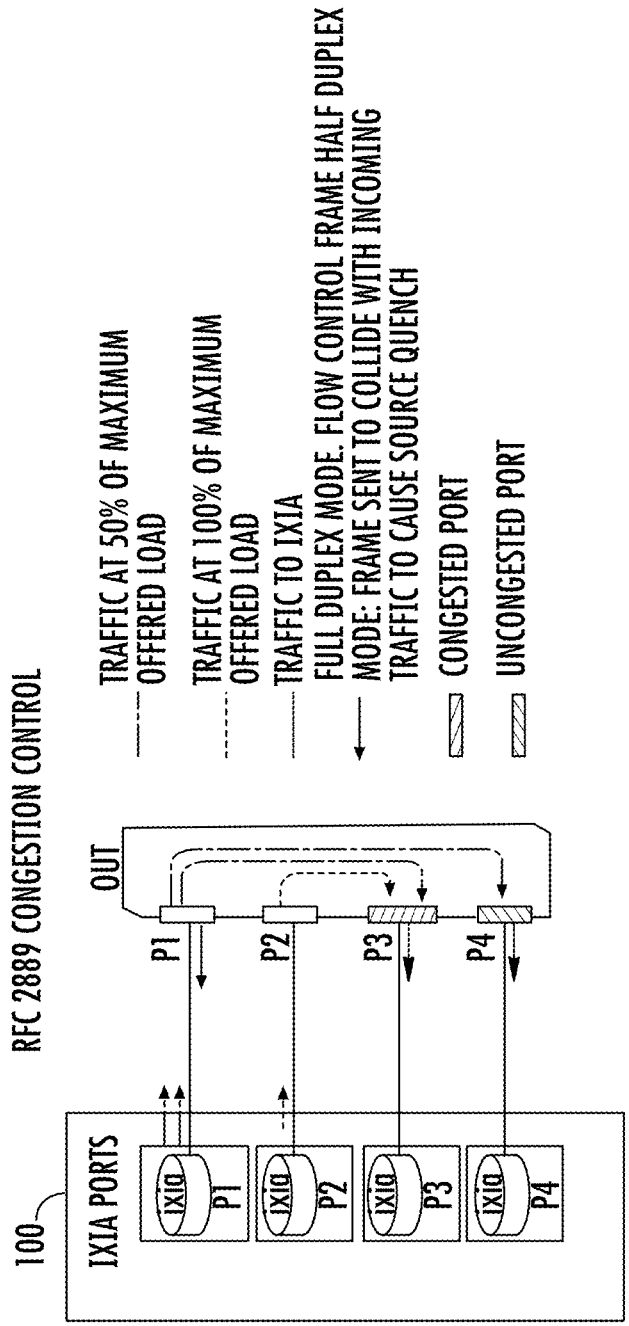
FIG. 8 is a block diagram illustrating an exemplary test setup for an IETF RFC 2889 congestion control test according to an embodiment of the subject matter described herein.

As shown in FIG. 8, port P1 of test device 100 is generating 50% traffic to port P3 and port P4 of the device under test. Similarly, port P2 of test device 100 is generating 100% traffic to P3 of the device under test. In this situation, P3 of the device under test is receiving 150% traffic, which is more than it can handle, causing congestion. Port P4 of the device under test is only receiving 50% traffic and remains uncongested. While running the test, if we notice any frame loss on P4 of the device under test, then it causes head of line blocking, which means that the congestion on the other port (i.e., port P3 of the device under test) caused traffic loss on uncongested port (i.e., port P4 of the device under test). Congestion on one port that causes frame loss on an uncongested port can be considered major issue with the DUT operation.

Also, in order to avoid traffic loss on a congested port, flow control mechanisms can be enabled to inform a traffic sender to pause (or slow down) traffic during certain time so that all received frames are processed and forwarded to desired destination.

During the test, if the frame loss occurs on the uncongested port then no points will be awarded to DUT. Frame loss on an uncongested port is unacceptable. On a congested port, up to 25% loss is considered acceptable and points will be awarded based on percentage loss incurred.

As indicated by Table 1 above, the congestion control test is assigned a maximum score of ten possible points. In the example above, port P3 of the device under test is the congested port and the remaining ports of the device under test are uncongested. Table 12 shown below illustrates hypothetical frame loss number that could occur on the congested port of the device under test for different frame sizes and corresponding frame loss scores.

TABLE 12

Score Assignment for RFC 2889 Congestion Control Test

| Frame Size | % Frame Loss | picked value | marker | −1*diff*factor | Score |
|---|---|---|---|---|---|
| 64 | 0 | −5 | 4 | 5 | 100 |
| 128 | 0 | −5 | 4 | 5 | 100 |
| 256 | 1 | −5 | 4 | 3.75 | 98.75 |
| 512 | 2 | −5 | 4 | 2.5 | 97.5 |
| 1024 | 0 | −5 | 4 | 5 | 100 |
| 1280 | 2 | −5 | 4 | 2.5 | 97.5 |
| 1518 | 5 | −30 | 6 | 5 | 75 |
| 2176 | 3 | −5 | 4 | 1.25 | 96.25 |
| 9216 | 25 | −100 | 25 | 0 | 0 |
| Score scale | 10 | | | | |
| Frame Loss Score | 8.5 | | | | |

In Table 12, the first column represents frame sizes that may be used in the congestion control test. The second column lists frame losses that could occur for each frame size. The third column represents picked values for each frame loss score, representing a frame loss score for the marker that is closest to and greater than the measured frame loss score. The fourth column represents the marker that is closest to and greater than the measured frame loss value. The fifth column represents the computation of the factor used to compute the frame loss score for each frame size. The factor value for frame loss score can be computed using Equation 3 above.

The last column is the frame loss score for each frame size. The frame loss score for each frame size can be computed using Equation 4 above. The frame loss score in the last row of Table 12 may be computed using Equation 1 as follows:

Frame loss score=aggregate frame loss score×total points/(number of frame sizes×100)

$$\frac{765 \times 10}{9 \times 100} = 8.5$$

Yet another test that may be performed and included as part of the composite score is the cloud performance test. The cloud performance test determines the traffic delivery performance of the device under test in forwarding a variety of north south and east west bound traffic in cloud computing applications. For example traffic from simulated Internet applications, such as social networking servers, web servers, streaming video servers, and other web application types may be generated and sent to the DUT. The input parameters include traffic types, rate, frame sizes, and traffic mesh. The test measures throughput latency, jitter, and loss on a per application traffic type. As indicated in Table 1 above, the results of the cloud performance test can be assigned a total score of 10. Exemplary cloud performance test data is not presented herein, as the data would look similar to the throughput and jitter data already described for the other tests. For purposes of this example, a total score of 8.2 is assumed for the cloud performance test.

Once all the testing has been completed, the multidimensional score will be generated using a combination of the points generated for each test. Using the examples described herein, Table 13 shown below illustrates a multidimensional score for these examples.

TABLE 13

Multidimensional Score Calculation

| Test | Actual Points | Total Possible Points |
|---|---|---|
| RFC2544 Throughput | 20.83 | 25 |
| RFC2544 Latency | 22.43 | 25 |
| RFC2544 Jitter | 6.23 | 10 |
| RFC2889 Congestion Control | 8.5 | 10 |
| RFC3918 | 8.459 + 7.94 = 16.39 | 20 |
| CloudPerf | 8.2 | 10 |
| Total Composite Score | 82.58 | 100 |

From Table 13, it can be seen that the composite score is a numeric value that encompasses multiple dimensions of device performance scores, including scores different parameters (latency, throughput, jitter, and frame loss due to congestion), scores for different testing standards (RFC 2544, 2889, and 3918), and scores for different application level conditions (cloud performance). The fact that the score is multidimensional makes apples to apples comparison of network equipment easier. Such a score, for example, may be used to compare performance of routers from vendor A from vendor B without having to compare the individual performance metrics.

The disclosure of each of the publications described herein, including IETF RFCs, is incorporated herein by reference in its entirety.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for benchmark reference testing of data center or network equipment, the method comprising:
   using a network or data center test device:
      executing a plurality of performance tests to test a plurality of different performance parameters of a network or data center device under test, wherein executing the performance tests includes generating test traffic, sending the test traffic to the network or data center device under test, and receiving the test traffic from the network or data center device under test and wherein the performance tests include separate tests for a plurality of different frame sizes for each of throughput, latency, jitter, and frame loss due to congestion;
      obtaining individual test results for each of the different performance parameters, wherein the individual test results include a composite score for the different frame sizes for each of latency, throughput, jitter, and frame loss due to congestion;
      generating a multi-dimensional score that combines the individual test results from the different performance parameters to indicate a composite performance of the data center or network device, wherein generating the multi-dimensional score includes generating the multi-dimensional score based on the received test traffic and wherein the multi-dimensional score comprises a single value that combines the composite scores for the different frame sizes for each of throughput, latency, jitter, and frame loss due to congestion; and
      outputting the multi-dimensional score to a user.

2. The method of claim 1 wherein executing a plurality of tests includes executing a plurality of different tests from different standards that evaluate the network or data center device for each of the performance parameters and wherein generating the multi-dimensional score includes combining results from the test from different standards for the same and different parameters.

3. The method of claim 1 wherein generating the multi-dimensional score includes assigning a number of total possible points to each test, calculating an individual score for each test based on the test results and the number of total possible points assigned to each test, and adding the individual scores for each test to generate the multi-dimensional score.

4. The method of claim 1 wherein the frame loss due to congestion comprises frame loss in an RFC 2889 congestion control test and wherein generating the multidimensional score includes assigning a point value to a frame loss score from the RFC 2889 congestion control test.

5. The method of claim 1 wherein the performance parameters comprise latency and throughput for a cloud performance test that tests the performance of the network or data center device under test for different Internet application traffic and wherein generating the multi-dimensional score includes assigning a point value to results from the cloud performance test.

6. The method of claim 1 comprising polling the network or data center device under test during the testing to obtain device state information.

7. A system for benchmark reference testing of data center or network equipment, the system comprising:
   a network or data center test device including:
      a traffic generation module for executing a plurality of performance tests to test a plurality of different performance parameters of a network or data center device under test, wherein executing the performance tests includes generating test traffic, sending the test traffic to the network or data center device under test, and receiving the test traffic from the network or data center device under test and wherein the performance tests include separate tests at a plurality of different frame sizes for each of throughput, latency, jitter, and frame loss due to congestion;
      a test results metrics module for obtaining individual test results for each of the different performance parameters, wherein the individual test results include a composite score for the different frame sizes for each of latency, throughput, jitter, and frame loss due to congestion; and
      a performance index module for generating a multi-dimensional score that combines the individual test results from the different performance parameters to indicate a composite performance of the data center or network device and outputting the multi-dimensional score to a user, wherein generating the multi-dimensional score includes generating the multi-dimensional score based on the received test-traffic and wherein the multi-dimensional score comprises a single value that combines the composite scores for the different frame sizes for each of throughput, latency, jitter, and frame loss due to congestion.

8. The system of claim 7 wherein the traffic generation module is configured to execute a plurality of different tests from different standards that evaluate the network or data center device for each of the performance parameters and wherein the performance index module is configured to combine results from the test from different standards for the same and different parameters.

9. The system of claim 7 wherein the traffic generation module is configured to assign a number of total possible points to each test and wherein the performance index module is configured to calculate an individual score for each test based on the test results and the number of total possible points assigned to each test and add the individual scores for each test to generate the multi-dimensional score.

10. The system of claim 7 wherein the frame loss due to congestion comprises frame loss in an RFC 2889 congestion control test and wherein the performance index module assigns a point value to a frame loss score from the RFC 2889 congestion control test.

11. The system of claim 7 wherein the performance parameters comprise latency and throughput for a cloud performance test that tests the performance of the network or data center device under test for different Internet application traffic and wherein the performance index module is configured to assign a point value to results from the cloud performance test.

12. The system of claim 7 comprising a polling module for polling the network or data center device under test during the testing to obtain device state information.

13. A non-transitory computer readable medium having stored thereon executable instructions that when executed by the processor of a computer control the computer to perform steps comprising:

using a network or data center test device:
  executing a plurality of performance tests to test a plurality of different performance parameters of a network or data center device under test, wherein executing the performance tests includes generating test traffic, sending the test traffic to the network or data center device under test, and receiving the test traffic from the network or data center device under test and wherein the performance tests include separate tests for a plurality of different frame sizes for each of throughput, latency, jitter, and frame loss due to congestion;
  obtaining individual test results for each of the different performance parameters, wherein the individual test results include a composite score for the different frame sizes for each of latency, throughput, jitter, and frame loss due to congestion;
  generating a multi-dimensional score that combines the individual test results from the different performance parameters to indicate a composite performance of the data center or network device, wherein generating the multi-dimensional score includes generating the multi-dimensional score based on the record test-traffic and wherein the multi-dimensional score comprises a single value that combines the composite scores for the different frame sizes for each of throughput, latency, jitter, and frame loss due to congestion; and
  outputting the multi-dimensional score to a user.

* * * * *